(No Model.)

G. W. SHAWK & A. S. WETMORE.
HYDRANT FILTER.

No. 299,275. Patented May 27, 1884.

WITNESSES
W. Engel
Chas. H. Dorer

George W. Shawk
Abbott S. Wetmore
By Leggett & Leggett
INVENTOR
ATTORNEYS

N. PETERS, Photo-Lithographer, Washington, D. C.

UNITED STATES PATENT OFFICE.

GEORGE W. SHAWK AND ALBERT S. WETMORE, OF CLEVELAND, OHIO.

HYDRANT-FILTER.

SPECIFICATION forming part of Letters Patent No. 299,275, dated May 27, 1884.

Application filed September 21, 1883. (No model.)

*To all whom it may concern:*

Be it known that we, GEORGE W. SHAWK and ALBERT S. WETMORE, of Cleveland, in the county of Cuyahoga and State of Ohio, have invented certain new and useful Improvements in Hydrant-Filters; and we do hereby declare the following to be a full, clear, and exact description of the invention, such as will enable others skilled in the art to which it pertains to make and use the same.

Our invention relates to improvements in hydrant-filters; and it consists in certain features of construction and in combination of parts hereinafter described, and pointed out in the claims.

Figure 1:
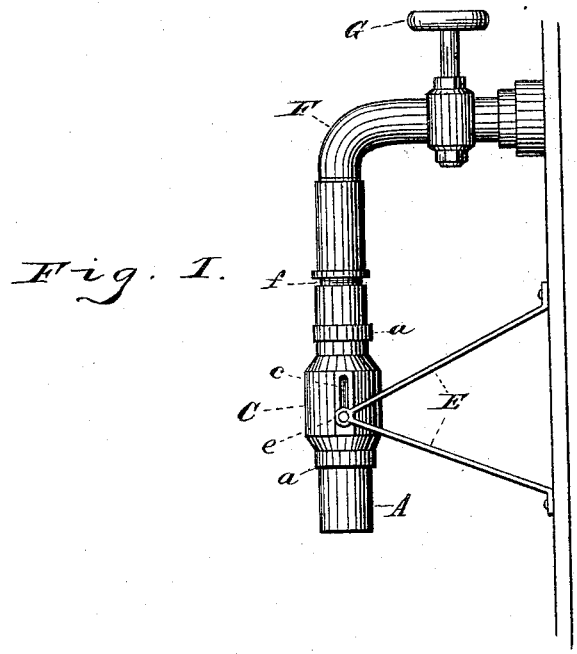
Figure 2:
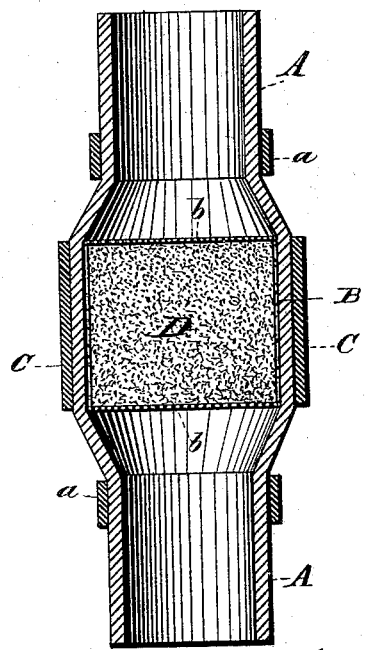

In the drawings, Figure 1 is an elevation view of our improved filter. Fig. 2 is a longitudinal vertical section of the same.

A represents a piece of rubber tube, into which is forced a thimble or hollow cylinder, B, preferably large enough to expand the tube, as shown.

C is a broad snugly-fitting band forced over the rubber tube and pressing the tube firmly upon the said inclosed cylinder B. Over each end of the cylinder is secured, and preferably by soldering, cylinder-heads $b$, of wire-gauze, and the space inside of the cylinder and between the gauze heads is packed with fine charcoal, D.

Either end of the rubber tube may be attached to a hydrant, and the water allowed to pass through the filter from either direction. First, the gauze will arrest the coarser part of the sediment, after which the water passes through the charcoal, the filtering qualities of which are well known. After a time the accumulation of sediment in the filter will obstruct the passage of the water. When this occurs, the filter should be reversed—that is, the other end of the filter-tube should be attached to the hydrant. The first action of the water after the said reversing will force out the accumulated sediment from the filter, after which the water will be found in good condition to use and well filtered; and this will continue until the passage of the water is again obstructed, requiring another reversing of the filter.

These filters may be made of any required size, and it is sometimes desirable to use one of the larger sizes on small hydrants or pipes, so that the filter may operate a long time without reversing.

The hydrant-pipe F is provided with the valve G and a nozzle, $f$, made slightly tapering, and of such size as will enter the tube A. The tube will be more or less expanded as it is forced onto the nozzle, after which the band $a$ is pressed by hand up onto the expanded part of the tube, pressing it firmly onto the inclosed nozzle, thus forming a joint sufficient for the purpose and easily disengaged.

The band C may be provided on opposite sides with the raised portions or bosses $c$, in which are respectively slots running longitudinally with the filter, as shown, and embracing the small trunnions $e$, that are attached to the brackets E, and that furnish a support upon which to revolve the filter in the process of changing ends, as aforesaid. When the filter is attached to the nozzle $f$, as shown in Fig. 1, the trunnions $e$ are near the bottom of the slots. The slots are of sufficient length to admit of lowering the filter until it is disengaged from the said nozzle. After the filter has been reversed and during the process of again coupling it to the said nozzle, the said trunnions and slots act as guides and keep the filter in a proper relative position to the nozzle. When the filters are so small that they are easily manipulated by hand, the said slots, trunnions, and brackets may be omitted.

What we claim is—

1. A hydrant-filter consisting of a flexible tube, a hollow cylinder adapted to inclose the filtering material and forced into said tube, and means for holding the same therein against displacement, substantially as set forth.

2. In a hydrant-filter, a flexible tube distended by an inclosed hollow cylinder, in combination with an outside band adapted to press the said tube upon the inclosed cylinder, substantially as described, and for the purpose set forth.

3. In a hydrant-filter, the combination, with a flexible tube, a cylinder provided with filtering material and inserted in said tube, and means for holding the same therein against displacement, of a movable band, $a$, encircling said tube, and adapted to hold it in position on the hydrant-nozzle, substantially as set forth.

4. The combination, with cylinder B, provided with the gauze ends, of the flexible tube A and the band C, substantially as and for the purpose set forth.

5. The bracket E, provided with the trunnions $e$, in combination with the band C, provided with the slotted bosses $c$, substantially as described, and for the purpose specified.

In testimony whereof we sign this specification, in the presence of two witnesses, this 13th day of September, 1883.

GEORGE W. SHAWK.
ALBERT S. WETMORE.

Witnesses:
CHAS. H. DORER,
W. E. DONNELLY.